US011896548B2

(12) United States Patent
Breighner et al.

(10) Patent No.: US 11,896,548 B2
(45) Date of Patent: Feb. 13, 2024

(54) FLOATING PHYSICAL THERAPY DEVICE

(71) Applicant: Joshua Breighner, Fanwood, NJ (US)

(72) Inventors: Joshua E. Breighner, Dallastown, PA (US); Sandra Saavedra, West Hartford, CT (US); Donna Snowdon, West Hartford, CT (US)

(73) Assignee: Joshua Breighner, Fanwood, NJ (US)

(*) Notice: Subject to any disclaimer, the term of this patent is extended or adjusted under 35 U.S.C. 154(b) by 626 days.

(21) Appl. No.: 17/092,560

(22) Filed: Nov. 9, 2020

(65) Prior Publication Data

US 2021/0137783 A1 May 13, 2021

Related U.S. Application Data

(60) Provisional application No. 62/933,097, filed on Nov. 8, 2019.

(51) Int. Cl.

| | |
|---|---|
| ***A61H 37/00*** | (2006.01) |
| ***A61H 3/00*** | (2006.01) |
| ***B63C 9/115*** | (2006.01) |
| ***B63C 9/135*** | (2006.01) |
| ***B63C 9/13*** | (2006.01) |
| ***B63B 34/50*** | (2020.01) |

(52) U.S. Cl.

CPC ........... *A61H 37/005* (2013.01); *A61H 3/008* (2013.01); *A61H 37/00* (2013.01); *B63B 34/50* (2020.02); *B63C 9/115* (2013.01); *B63C 9/13* (2013.01); *B63C 9/135* (2013.01); *A61H 2201/0115* (2013.01); *A61H 2201/0192* (2013.01); *A61H 2201/1611* (2013.01); *A61H 2201/1652* (2013.01); *A61H 2203/02* (2013.01); *A63B 2208/03* (2013.01); *A63B 2225/60* (2013.01); *A63B 2225/605* (2013.01)

(58) Field of Classification Search

CPC ... B63B 34/50; B63C 9/082; B63C 2009/084; B63C 9/13; B63C 9/135; A63B 69/12; A63B 69/14; A63B 2208/03; A63B 2225/60; A63B 2225/605; A61H 3/008; A61H 37/00; A61H 37/005; A61H 2203/02; A61H 2201/0115; A61H 2201/0192; A61H 2201/1611; A61H 2201/1652; A47C 15/006

See application file for complete search history.

(56) References Cited

U.S. PATENT DOCUMENTS 844,580 A * 2/1907 Cline ...................... B63C 9/082 441/81
4,443,204 A * 4/1984 Perrin .................. A61H 37/005 434/262

(Continued)

*Primary Examiner* — Ajay Vasudeva
(74) *Attorney, Agent, or Firm* — Getz Balich LLC

(57) ABSTRACT

A floating physical therapy device includes a frame and a harness. The frame includes an inner frame and an outer frame on the right and left side. The inner frame defines a patient area. The harness is attached to the inner frame such that it secures a patient to the device in a substantially upright position during use. The frame extends forwards and backwards, as well as to the left and right, of the patient area in order to provide stability in the water during normal use. The frame defines a trainer area immediately forward of the patient area where a therapist can have access to the patient during therapy sessions.

10 Claims, 5 Drawing Sheets

(56) References Cited

U.S. PATENT DOCUMENTS

| | | | | | |
|---|---|---|---|---|---|
| 4,551,108 | A * | 11/1985 | Bass | A61H 37/005 | 441/116 |
| 4,722,329 | A * | 2/1988 | Kalvag | A61H 1/0229 | 606/241 |
| 4,738,212 | A * | 4/1988 | Schweitzer | B63H 9/04 | 114/313 |
| 5,092,589 | A * | 3/1992 | Packer | A63B 23/03575 | 482/92 |
| 5,105,804 | A * | 4/1992 | Van Nostrand | A61H 37/005 | 606/241 |
| 5,385,497 | A * | 1/1995 | Chu | A63B 35/00 | 114/352 |
| 5,409,412 | A * | 4/1995 | Colon | A61H 37/005 | 114/61.1 |
| 6,843,695 | B1 * | 1/2005 | Jackson | B63B 34/52 | 441/129 |

* cited by examiner

FLOATING PHYSICAL THERAPY DEVICE

CROSS-REFERENCE TO RELATED APPLICATION

This application claims the benefit of priority of U.S. Provisional Application No. 62/933,097 filed Nov. 8, 2019, the entire disclosure of which is incorporated herein by reference in its entirety.

FIELD OF THE INVENTION

The present invention is generally directed to a floating physical therapy tool and, more particularly, to a floating physical therapy tool that maintains a patient in an upright position in the water during treatment.

BACKGROUND

Patients, especially children with moderate to severe developmental disabilities, frequently benefit from physical therapy sessions in the pool. Aquatic therapy offers physiological and anatomical level benefits to the patients. During these sessions, patients, especially those that are non-ambulatory, are able to exercise and enjoy a freedom of movement not capable outside of a pool.

In the past, in order to administer pool therapy, therapists have needed either the assistance from a second person (e.g., a parent) holding the patient, or the therapist has held the patient while also administering the desired therapy. In addition to being tiring, holding the weight of the patient does not provide the patient with a sense of independence or freedom.

Therefore, there is a need in the art for a device that holds a patient upright in the water during an in-pool therapy (or play) session. Additionally, there is a need in the art for a device that enables a patient to remain safe yet still semi-autonomous in the water during treatment or play.

SUMMARY

According to the present invention, a floating physical therapy device includes a frame and a harness. The frame includes an inner frame and an outer frame on both the left and right sides. The inner frame defines a patient area and the outer frame extends outward to provide stability during normal use in the water. The harness is attached to the inner frame such that it secures a patient to the device safely with both his or her head above the water level and in a generally upright position. The device includes at least one float so that it is buoyant in the water. In order for the therapist to have easy access to the patient secured to the device, a trainer area immediately in front of the patient area that is free of frame material is provided.

According to another aspect of the present invention, a headrest may be provided. The headrest can be removable and is often made of semi-rigid foam material.

According to a further aspect of the present invention, the harness can include a shirt, padding and straps. The padding is affixed to the inner frame material and includes hook and loop fastener material. The shirt is worn by the patient and can be removably affixed to the padding. The straps provide additional means to secure the patient in the device.

According to an even further aspect of the present invention, the left and right frames are movable relative to one another which enables an end user to selectively make the patient area either narrower or wider. Locking mechanisms are also provided in order to enable a user to selective set the width of the patient area to match the size of the patient.

One advantage of the present invention is that a therapist can treat a patient in the water without the need to have an assistant or to simultaneously hold the patient in an upright position while administering treatment.

A second advantage of the present invention is that the patient has autonomy in the water.

A third advantage of the present invention is that, in addition to being useful for pool therapy sessions, the device can also be used for recreational activities.

DETAILED DESCRIPTION OF THE INVENTION

Figure 1:
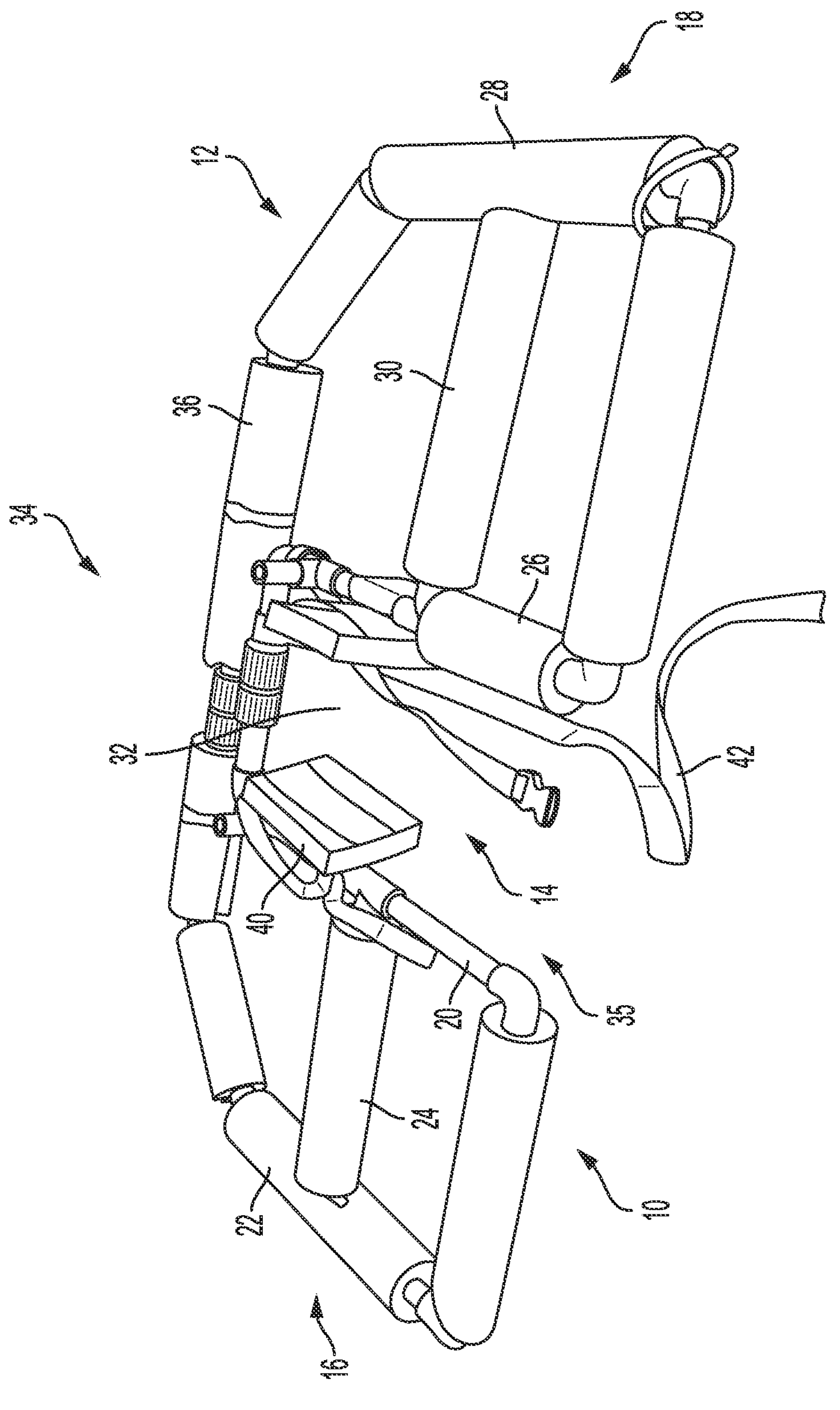
FIG. 1 shows a perspective view of one embodiment the present invention.

One embodiment of the floating physical therapy device is identified in FIG. 1 by the numeral 10. The floating physical therapy tool 10 includes a frame 12 and a harness 14. The frame 12 includes a left frame 16 and a right frame 18. The harness 14 that secures the patient to the device 10 is at least partially attached to the frame 12.

The left frame 16 includes an inner frame 20 and an outer frame 22. The inner frame 20 and outer frame 22 can either be directly connected or, as shown in FIG. 1, include at least one intermediate frame member 24 that rigidly connects the two portions. The inner frame 20 at least partially defines a patient area 32.

Similarly, the right frame 18 also includes an inner frame 26 and an outer frame 28. The inner frame 26 and the outer frame 28 on the right frame 18 can also include at least one intermediate frame member 30 that rigidly connects the two portions. Along with the inner frame 20 on the left frame 16, the right frame also at least partially defines the patient area 32.

The left frame 16 and the right frame 18, in some embodiments, may be permanently connected in a rigid, non-adjustable fashion. However, as shown in particular in FIGS. 2 and 3, the left frame 16 and the right frame 18 are adjustable relative to one another. In this embodiment, the left frame 16 and the right frame are 18 movable between various locked positions such that the patient area 32 can be made wider or narrower, as necessary. In one embodiment, having a patient area that has a width that is adjustable between about 25 cm and 32 cm has been shown to have particular utility for smaller patients. In other embodiment, having a patient area that has a width that is adjustable between about 26 cm and 32 cm has been shown to have particular utility for larger patients. The invention should not be considered limited to the above size ranges and can be either larger or smaller.

Any suitable adjusting means are acceptable for enabling the adjustment and locking of the relative position of the left frame 16 and right frame 18. For example, friction locking mechanisms 34 provide unlimited number of user-selected positions. Alternatively, pin-in-hole locking cams are also well-known to provide secure relative positioning of the two frame sides 16, 18 at pre-defined incremental positions. On the embodiment shown in FIGS. 1-3, two friction locking mechanisms 34 are provided. One locking mechanism 34 connects the inner frames 20, 26 and another mechanism 34 connects the outer frames 22, 28. In the position shown in FIG. 2, the left and right frames 16, 18 are in relatively close proximity for use with, e.g., a smaller patient. In the position shown in FIG. 3, both locking mechanisms 34 have been loosened, the left and right frames 16, 18 have been moved apart from one another, and the patient area 32 has been enlarged. After adjustment, the locking mechanisms 34 are re-tightened to secure the new, extended or narrower position. In the embodiment shown, one frame side is slightly smaller and telescopes inside the other frame side during adjustment. However, the present invention should not be considered so limited. For example, the left and right frames 16, 18 could alternatively slide next to each other during adjustment.

Figure 2:
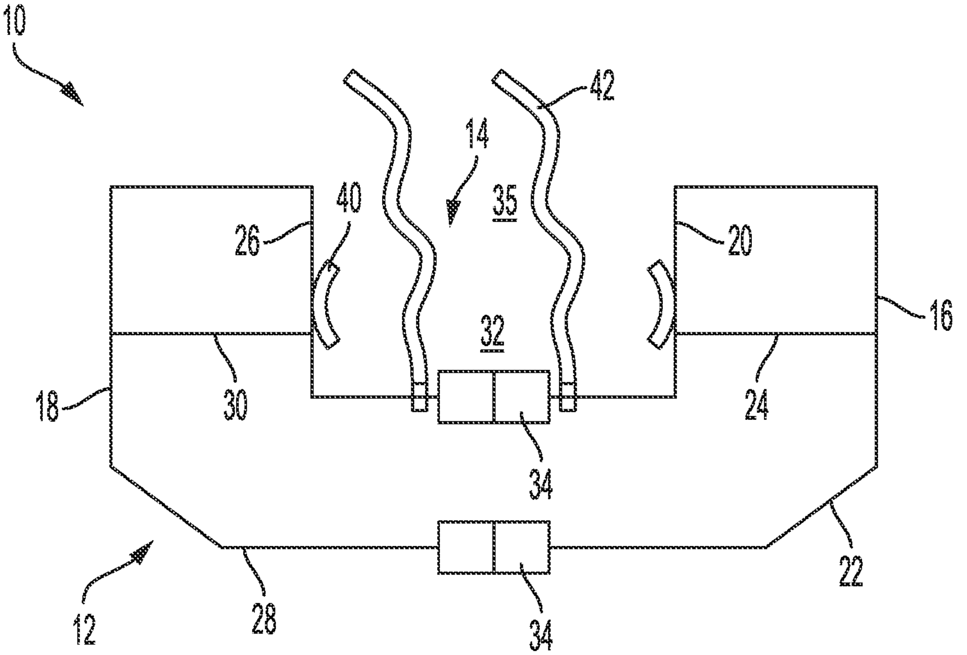
FIG. 2 shows a top view of one embodiment of the present invention in a generally narrow position (without floats)
Figure 3:
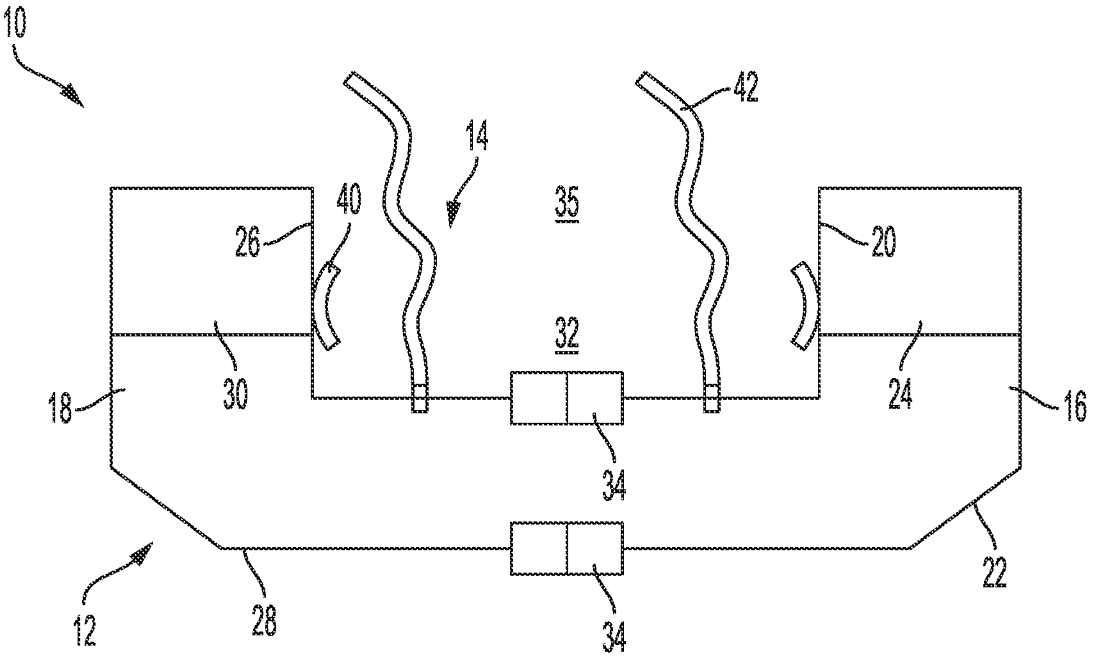
FIG. 3 shows a top view of the device in FIG. 2 in a generally extended position (without floats)

Continuing to refer to FIGS. 1-3, the outer frames 22, 28 can be shaped in any suitable manner provided that the left frame 16 and right frame 18, in addition to extending to the left and right of the patient area 32, also extend forward and rearward of the patient area 32. The outer footprint of the outer frames 22, 28 is intended to provide stability to the entire device 10 and patient in the water during use. Therefore, when determining the size and shape of the outer frames 22, 28, the designer must take into account several factors including, but not limited to: 1) the height and weight of the patient, 2) the location of the patient area in the frame 12, and 3) the height of the patient relative in the water. Outer frames 22, 28 having a total width (i.e., side to side) of between about 90-120 cm and a total length (i.e., front to back) of between about 50-60 cm have been shown to have particular utility.

In addition, immediately forward of the patient area 32 there is a trainer area 35 that preferably has no frame material (i.e., a void). The lack of frame material in the trainer area 35 provides at least two advantages: 1) the trainer area 35 allows for ease of entry for the patient into the patient area 32 when entering and exiting the device 10, and 2) the trainer area 35 provides a physical therapist the ability to be in close proximity to the patient during treatment without having to, e.g., reach over or across the frame 10.

The frame 10 can be made of any suitable material, provided that the materials enable the frame 10 to have ample structural stability during normal use and sufficient buoyancy to remain afloat for the intended patients. For example, PVC piping is relatively inexpensive, can be formed into a variety of shapes easily, and has been shown to provide the necessary structural stability. Furthermore, since the device 10 is intended to be used in a harsh pool environment, selecting a material like PVC has been shown to be advantageous due to its corrosion resistance. As shown in FIG. 1, several polyethylene foam floats 36 were added to the structural PVC frame material that enable the frame to have ample buoyancy in the water. While polyethylene foam is readily available and inexpensive, other flotation means, such as inflatables, can be used without departing from the scope of the present invention. In the embodiment shown, floats 36 are provided in several locations around the extremes of the frame 12 to ensure maximum stability in the water during use.

In other embodiments, although not shown, the left and/or right frame 16, 18 can be made of, e.g., a molded plastic material that is vacuum sealed thereby providing both the necessary structural stability and buoyancy without the need for additional float 36 element(s).

The harness 14 secures the patient to the frame 12 such that he or she is in a substantially upright position in the water during use. In addition, the harness 14 is intended to allow the patient to substantially freely move his or her arms and legs in the water.

Figure 4:
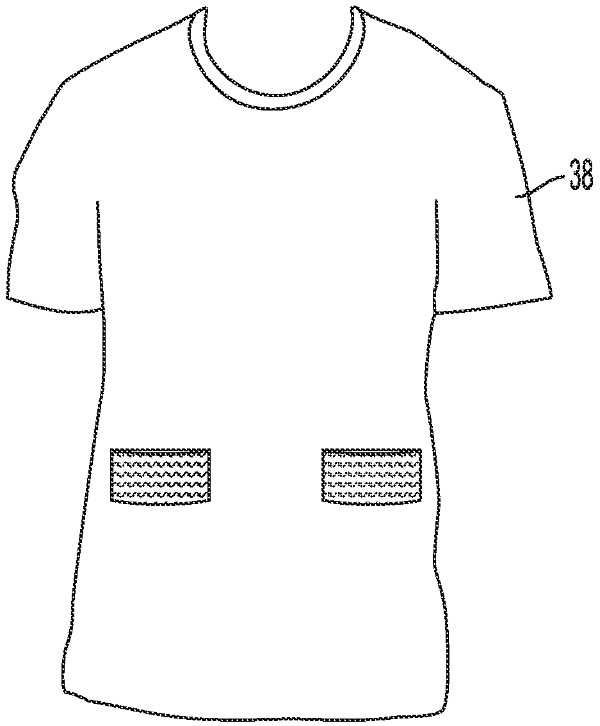
FIG. 4 shows a shirt that is part of a harness in one embodiment of the present invention.

In one embodiment, and now referring to FIGS. 1-4, the harness can include a shirt 38 that is worn by the patient, padding 40 attached to the inner frames 20, 26, and at least one strap 42. The shirt 38, as shown in FIG. 4, is preferably either made of a material that connects to a hook and loop fastener and/or includes hook and loop fasteners 44 applied thereon. Therefore, the shirt 38 (or vest) is capable of mechanically fastening quickly and easily to complementary hook and loop fasteners located on the padding 40, the frame 12, and/or the strap(s) 42. The padding is preferably attached to the inner frames 20, 26 on the left and right such that their relative position to each other varies when the frame 12 width is adjusted to match the size of the patient. The straps 42 can be attached to the frame 12 and/or padding 40 in order to more securely hold the patient in the device 10 during use. Although not shown in FIG. 4, the shirt 38 can also extend between the patient's legs. In such an embodiment, when the straps are applied, the patient is held more securely at the desired height relative to the frame 12 without slipping lower in the water.

The harness 14 preferably enables the therapist to select the height relative to the water level where the patient is secured. In preferred embodiments, the patient's head is safely above the water and the water level is generally between his or her chin and waist. In addition, the harness 14 is positioned preferably near the center of the frame 12 to ensure maximum stability in all directions. However, the present invention should not be considered so limited. For example, there may be a desire to have a patient tip slightly forward in the water. In such a situation, having the harness 14 located slightly forward of the center of the frame 12 may be desirable.

While the above harness 14 is one example of a manner in which the patient can be secured in the device 10, one of skill in the art would be aware that other embodiments are available that would work equally as well. For example, although not shown, the harness 14 can include a vest (e.g., a life preserver) that is secured to the inner frames 20, 26. In such an embodiment, a separate shirt 38 would not be necessary for the patient to put on prior to entering the pool. Rather, the patient would be simply put the entire device 10 on either in or out of the pool in a single step. In addition, and now referring to FIG. 6, below the surface of the water, a seat or a bar 44 can be added that extends between the legs of the patient. In such an embodiment, the seat or bar 44 provides support to the patient at the desired height from below, preferably in a manner that does not substantially hinder leg movement.

Figure 5:
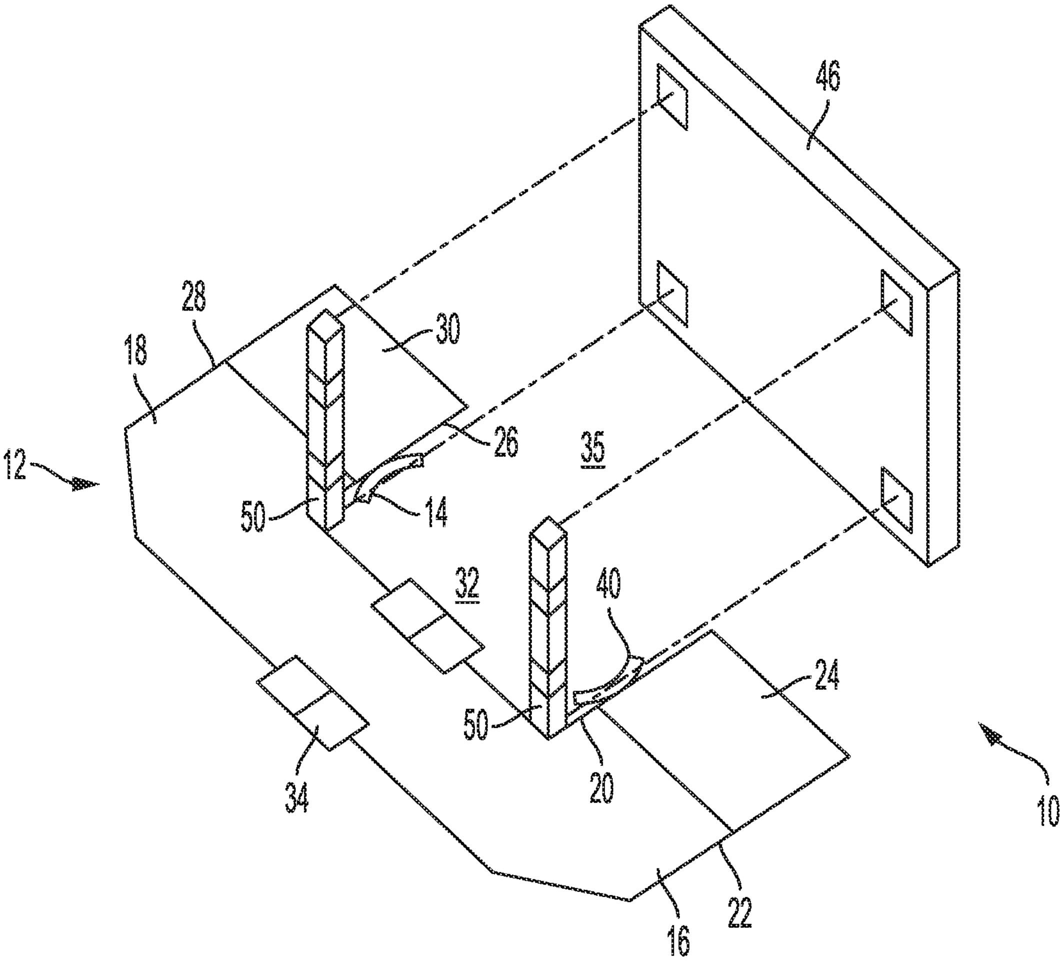
FIG. 5 shows a perspective view of an embodiment of the present invention having a removable headrest (without floats)

Additional features are also available to improve the present invention or to address specific needs of individual patients. For example, and now referring for FIG. 5, the device 10 can include a headrest 46 for, e.g., patients lacking full head control. As shown, the headrest 46 extends upwards from the inner frames 20, 26 immediately behind the patient area 32 and prevents the patient's head from tipping backwards during normal use. While not shown, additional embodiments can also include features that support the patient's head on one or both sides. While numerous materials can be selected to perform the function of the headrest 46, semi-rigid foam material has been shown to have particular utility. For example, a foam kickboard that is readily available at most public pools has been found to form a useful headrest 46. The material is both comfortable to the patient and is known to be able to withstand the harsh pool environment. As shown in FIG. 5, the headrest 46 is removable and, therefore, can be put in place for patients that would benefit from the added support, but removed for patients who do not. Still referring to FIG. 5, the headrest includes two vertical supports 50 made from PVC with the semi-rigid foam headrest 46 attached using hook and loop fasteners.

Figure 6:
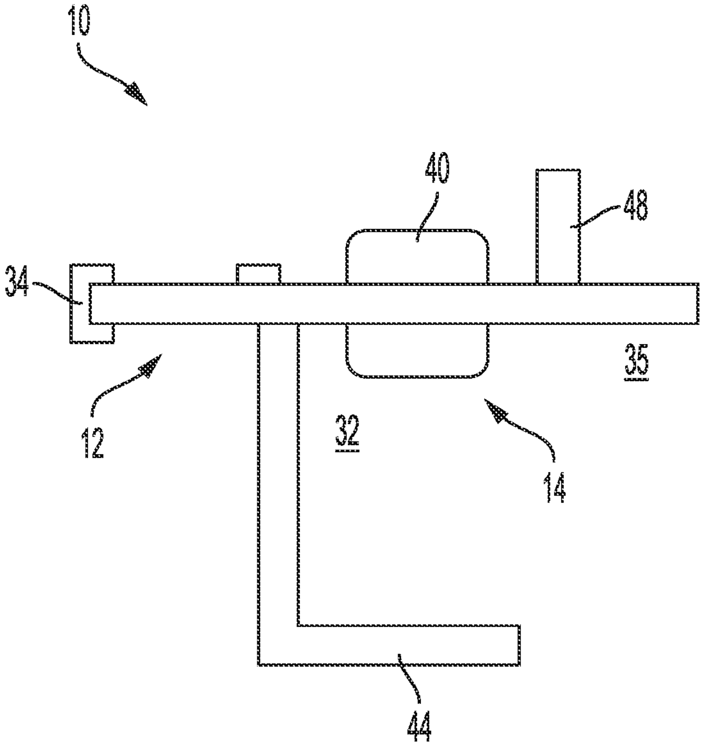
FIG. 6 shows side view of an alternate embodiment of the present invention (without floats).

In even further embodiments, and now referring now to FIG. 6, the device 10 may include, e.g., handles 48 so the patient can have a place to put his or her hands for added stability during treatment. Or, although not shown, a tray can extend in front of the patient in the patient area 32 and/or the trainer area 35. The tray can made constructed out of any suitable material such, for example, a kick-board in similar fashion and for similar reasons as the headrest 46. During use, the tray can provide the patient with a location for his or her hands, and/or can also prevent a patient that may have little head control from having his or head drop forward into the water.

In normal use, the patient dons the dedicated shirt 38, enters the pool and, often with the assistance of a therapist, enters the patient area 32 of the device 10 via the therapist area 35. The therapist adjusts the relative positioning of the left frame 16 and right frame 18 using the locking mechanism(s) 34 in order to tailor the device 10 to fit the particular patient receiving treatment. The patient's shirt 38 mechanically attaches to the hook and loop fastener on the padding material 40 in the harness 14 at a desired height relative to the water surface. The patient generally faces towards the trainer area 35 during normal use. The additional straps 42 are then applied in order to fully secure the patient in the device 10. The desired treatment may now begin with the trainer having access to the patient via the trainer area 35. The device 10 maintains the patient in an upright position in the water for treatment while providing the patient with a sense of freedom and independence in the water. The therapist may then perform the desired therapy without the need to either simultaneously physically support the patient in the water or have a second person also in the pool providing the patient with support. The patient can then receive treatment from a single therapist, or simply enjoy playing autonomously in the pool in a manner not previously possible without the device 10.

One of skill in the art would understand that modifications to the above design above and beyond the specific embodiments disclosed without departing from the spirit and scope of the invention.

We claim:

1. A floating physical therapy device, comprising:

a u-shaped rigid frame having a permanently open front and closed rear, the frame having an inner frame and an outer frame, the inner frame having substantially parallel sides defining a patient area;

a harness attached to the inner frame that secures a patient to the device such that the patient is in a substantially upright position with the water level located between his or her waist and chin during use;

wherein the outer frame extends forwards and backwards, as well as to the left and right, of the patient area;

wherein the device is buoyant in the water during normal use; and wherein the frame defines a trainer area defined by a void in the frame immediately forward of and adjacent to the patient area; and wherein the permanently open front of the frame provides unobstructed access to the patient area.

2. The floating physical therapy device of claim 1, further comprising a headrest.

3. The floating physical therapy device of claim 2, wherein the headrest is removable and formed from semi-rigid foam material.

4. The floating physical therapy device of claim 1, wherein further including a first padding and a second padding affixed to the inner frame.

5. The floating physical therapy device of claim 4, wherein the first and second paddings include hook and loop fastener material.

6. The floating physical therapy device of claim 5, wherein the harness further includes a shirt that is worn by the user, the shirt being selectively attachable to hook and loop fastener material.

7. The floating physical therapy device of claim 6, wherein the harness further includes at least one strap attached to the frame that further secures a patient in the device.

8. The floating physical therapy device of claim 1, wherein a left side portion of the frame and a right side portion of the frame are movable relative to one another in a manner such that a width of the patient area is user-adjustable.

9. The floating physical therapy device of claim 8, wherein further comprising a locking mechanism, the locking mechanism is selectively locks the left side portion and the right side portion of the frame relative to one another so that the width of the patient area can be a selected distance during normal use.

10. The floating physical therapy device of claim 1 wherein the frame includes at least one foam float.

* * * * *